(12) United States Patent
Barakat (10) Patent No.: US 10,489,050 B2
(45) Date of Patent: Nov. 26, 2019

(54) USER INTERFACE WITH AUTOMATIC MOVEMENT TO DRIVER WINDOW

(71) Applicant: Salleh M Barakat, Paterson, NJ (US)

(72) Inventor: Salleh M Barakat, Paterson, NJ (US)

(*) Notice: Subject to any disclaimer, the term of this patent is extended or adjusted under 35 U.S.C. 154(b) by 0 days.

(21) Appl. No.: 16/291,181

(22) Filed: Mar. 4, 2019

(65) Prior Publication Data

US 2019/0196687 A1    Jun. 27, 2019

(51) Int. Cl.
| | |
|---|---|
| *G06F 19/00* | (2018.01) |
| *G06F 3/0488* | (2013.01) |
| *B60K 35/00* | (2006.01) |
| *F16M 11/04* | (2006.01) |
| *G06F 3/041* | (2006.01) |

(52) U.S. Cl.
CPC ............ *G06F 3/0488* (2013.01); *B60K 35/00* (2013.01); *F16M 11/04* (2013.01); *G06F 3/0416* (2013.01)

(58) Field of Classification Search
CPC ....... B60K 35/00; F16M 11/04; G06F 3/0416; G06F 3/0488
See application file for complete search history.

(56) References Cited

U.S. PATENT DOCUMENTS

| | | | |
|---|---|---|---|
| 5,482,139 A | 1/1996 | Rivalto | |
| 5,717,568 A * | 2/1998 | Clutter | ...................... G07F 7/00 |
| | | | 186/41 |
| 6,574,603 B1 | 6/2003 | Dickson et al. | |
| 6,996,460 B1 * | 2/2006 | Krahnstoever | ......... G06F 3/011 |
| | | | 701/1 |
| 7,343,174 B2 | 3/2008 | Suryanarayana et al. | |
| 9,367,226 B2 * | 6/2016 | Hrabosky | .......... G06Q 30/0281 |
| 2002/0156682 A1 | 10/2002 | DiPietro | |
| 2016/0250754 A1 * | 9/2016 | Chang | .................... B25J 9/1664 |
| | | | 700/259 |
| 2017/0293983 A1 | 10/2017 | Long | |

* cited by examiner

*Primary Examiner* — Harry Y Oh
(74) *Attorney, Agent, or Firm* — Michael J. Feigin, Esq.; Feigin and Fridman LLC (57) ABSTRACT

A drive through window has a user interface allowing one to place an order using a touch screen, voice commands, or combination thereof. The user interface can have a display screen and can accept payment via a magnetic strip reader, wireless transmission of data, or other payment mechanisms used. When a vehicle approaches a drive through, the vehicle is instructed to stop (based on signage, a gate, or other indicator) and cameras (are used to) determine the location of a driver of the vehicle and/or window associated with the driver. Once the location is determined, the user interface is put into position by moving a support structure for the interface along a horizontal axis, vertical axis, and finally along a depth axis until the interface is within reach of the driver and in some embodiments, passes through a window and into a cabin of the vehicle.

20 Claims, 12 Drawing Sheets

USER INTERFACE WITH AUTOMATIC MOVEMENT TO DRIVER WINDOW

FIELD OF THE DISCLOSED TECHNOLOGY

The disclosed technology relates to a method and devices for drive through ordering, and more specifically to devices which automate the process.

SUMMARY OF THE DISCLOSED TECHNOLOGY

A positonable user interface is mounted to an arm, such as a telescoping, hinged, or otherwise contractable and extendable arm in embodiments of the disclosed technology. The arm is movable along three axes by way of a support structure connected to the arm. Input devices, such as cameras (visible and/or infrared) are used to receive data to determine a position of a window and/or window frame of a vehicle. A device operable to position the arm, such as a processor, motors, and other control units are used to position the arm and the user interface in a horizontal plane and vertical plane which is within a corresponding horizontal plane and vertical plane of the window frame (which includes a position in relation to the window frame such that a person within the vehicle can reach the user interface and operate the user interface based on touch or voice controls. An extending mechanism extends the user interface to be adjacent to and/or inside (passing through) the window frame in embodiments of the disclosed technology.

The user interface is positioned in the horizontal plane of the window frame by way of moving a support structure, which supports the user interface. The support structure is moved along horizontal rails to move the user interface horizontally (defined as "parallel or substantially parallel to a direction of movement of a vehicle alongside the support structure"). The user interface is positioned in the vertical plane of the window frame by way of raising or lowering the arm along vertical rails in embodiments of the disclosed technology. The extending mechanism is the arm in some embodiments, the arm extended by telescoping to increase a length thereof.

One or both of the horizontal rails and the vertical rails are held within a housing having a portal through which the arm passes in embodiments of the disclosed technology. The portal through which the arm passes is closed and movably openable to a wider opening, but for, in some embodiments, a slit which moves with a horizontal position of the user interface and the arm. As such, a portal which allows for horizontal movement of the arm is closed at least a majority or at least 80% thereof with an opening around the arm, the opening moving with the arm in some embodiments of the disclosed technology.

The input devices can include one or more of visible and infrared cameras and use a combination of depth sensing and pre-entered data about shapes of vehicles and positions of windows to determine a position of the window frame. The depth sensing can further be used to determine if a window is blocking a path through the window frame. The user interface is prevented from operation while moving and is operable for user interaction after being placed adjacent to or through the window frame in embodiments of the disclosed technology.

Describing the technology in other words, a positionable user interface is configured to move in each of an X-axis, Y-axis, and Z-axis. "Configured to" for purposes of this disclosure is defined as "designed to do as such during ordinary functional operation as intended by the creator or builder thereof." Movement in the X-axis is by way of stationary horizontal rails and a movable support structure which moves along the rails. Movement along the Y-axis is accomplished by way of stationary vertical rails on the support structure (which, in turn, moves along the X-axis as described in the previous sentence). The stationary vertical rails have a telescoping arm which moves up and down there-on (where "up" and "down" are relative to ground and/or a center of the Earth with "down" being towards the center of the Earth). Movement in the Z-axis is accomplished by way of a telescoping arm which is directly or indirectly connected and/or supported by the vertical rails, the telescoping arm extending and/or retracting in length to move the user interface attached thereto. Cameras receive data sufficient to determine a position of at least a part of a vehicle. A processor using the data sufficient to determine the position of the at least a part of the vehicle sends instructions to move the user interface in at least one of the X-axis and the Y-axis. The instructions or additional instructions further cause the user interface in the Z-axis to move the user interface towards the vehicle.

The detection of the vehicle and moving of the user interface there-towards can be a window frame of a vehicle such as a frame around a driver's side window (front left side window in U.S. cars, front right side window in British and other cars where driving is on the left side of the road). The user interface is moved adjacent to the window and/or through the window frame in embodiments of the disclosed technology.

The user interface is operable to interact with a person in the vehicle when the user interface is stationary with respect to the ground. This includes stationary along the three aforementioned axes described. When moving, the user interface can be disabled (fail to receive or process user input such as by way of touch or voice) to prevent or discourage injury to a person or breakage of the device. The cameras can include an infrared camera used to determine an open, closed, or moving state of a window in a window frame and a result of a changed said state of the window movement, the user interface operability and/or position changes. For example, when a window or the vehicle moves, the user interface may retract along the Z-axis or turn off a screen in embodiments of the disclosed technology.

The user interface moving towards the vehicle along the Z-axis is carried out only when the window is determined to be in the open state and in a non-moving state in embodiments of the disclosed technology. Should the telescoping arm be expanded towards the vehicle and it is detected that a window of the vehicle is moving, the telescoping arm retracts in some embodiments of the disclosed technology.

The support structure is within a housing having a closable portal on a side thereof in some embodiments, the telescoping arm extending through the closable portal. The telescoping arm extends through a slit of the closable portal in some embodiments.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

A drive through window has a user interface allowing one to place an order using a touch screen, voice commands, or combination thereof. The user interface can have a display screen and can accept payment via a magnetic strip reader, wireless transmission of data, or other payment mechanisms used. When a vehicle approaches a drive through, the vehicle is instructed to stop (based on signage, a gate, or other indicator) and cameras (are used to) determine the location of a driver of the vehicle and/or window associated with the driver. Once the location is determined, the user interface is put into position by moving a support structure for the interface along a horizontal axis, vertical axis, and finally along a depth axis until the interface is within reach of the driver and in some embodiments, passes through a window and into a cabin of the vehicle.

Embodiments of the disclosed technology will become more clear in view of the following description of the figures.

Figure 1:
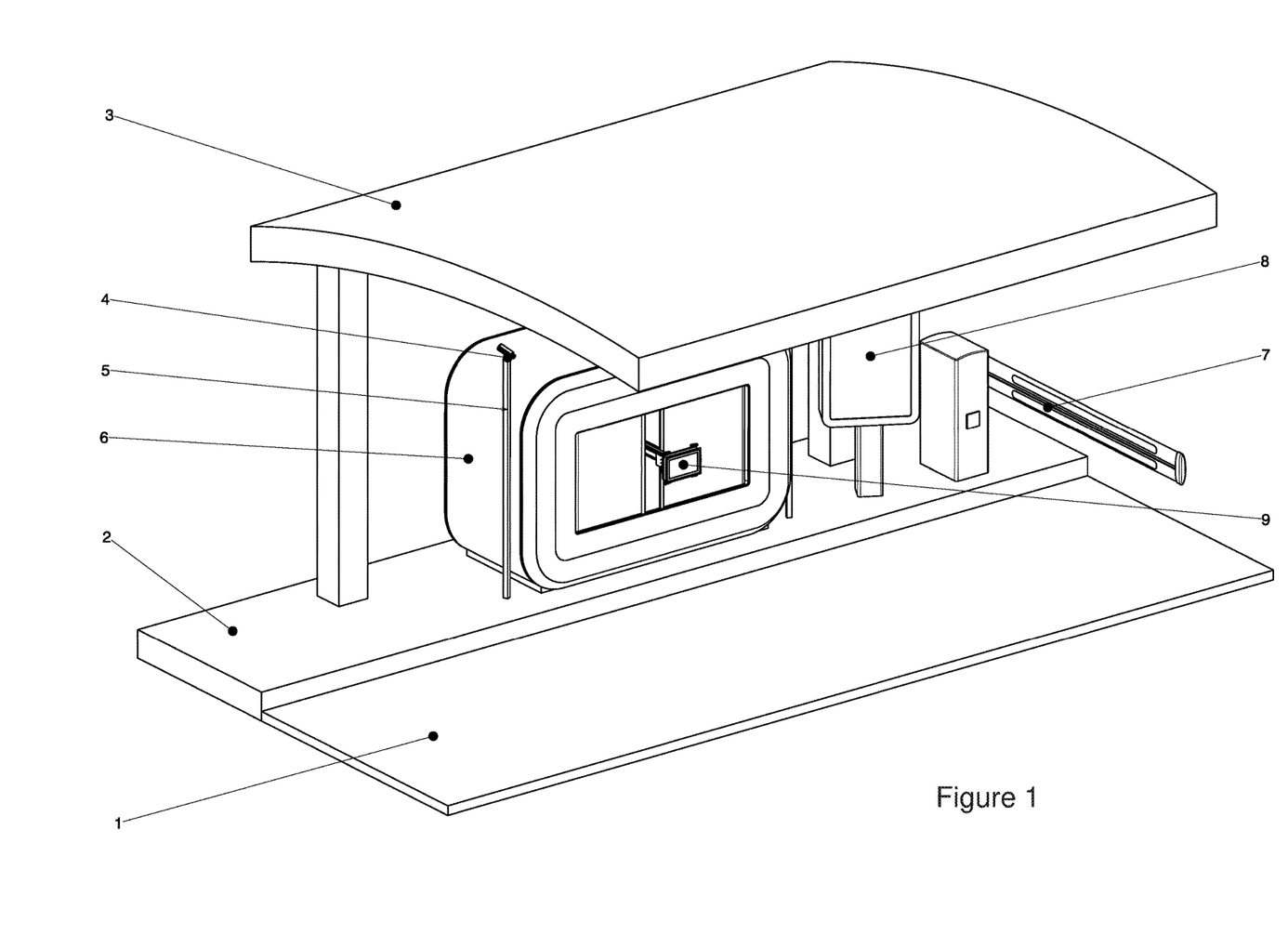
FIG. 1 shows a perspective view of a drive through station in an embodiment of the disclosed technology.

FIG. 1 shows a perspective view of a drive through station in an embodiment of the disclosed technology. A driveway 1 or other ground is used for a vehicle to pass over next a curb 2 or raised platform which is optionally placed next to the driveway. An optional roof 3 can be used to shield the vehicle from the elements as well as an interface 9 which is extended from a housing 6 in embodiments of the disclosed technology. The housing has rails and a movable post on which the interface 9 is attached as well as a portal to the outside. When the interface is in a "resting" condition such as when a vehicle is not present or a window of the vehicle is closed, the interface 9 is within the portal whereas when the interface 9 is an "active" state such that it is being extended towards or into a vehicle, the interface 9 extends through and outside of the portal. This will be described in more detail with reference to the below figures. A sign 8 can be used to display options about ordering or provide instructions to a driver of a vehicle to position his car in a position where the interface 9 can be moved with reach of the driver.

Still discussing FIG. 1, a camera 4 or a plurality of cameras which sense visible light and/or infrared light are used to determine a position of a vehicle in order to properly position the interface 9 inside or adjacent to a vehicle. Such a camera 4 can be supported on a pole 5. A gate 7 can be used to prevent or strongly discourage movement of the vehicle while the interface 9 is extended adjacent or into a vehicle. "Adjacent" for purposes of this disclosure is defined as "close enough such that a person can physically touch and/or operate" the device which is adjacent thereto and can be within about two feet, within two feet, or less.

Figure 2:
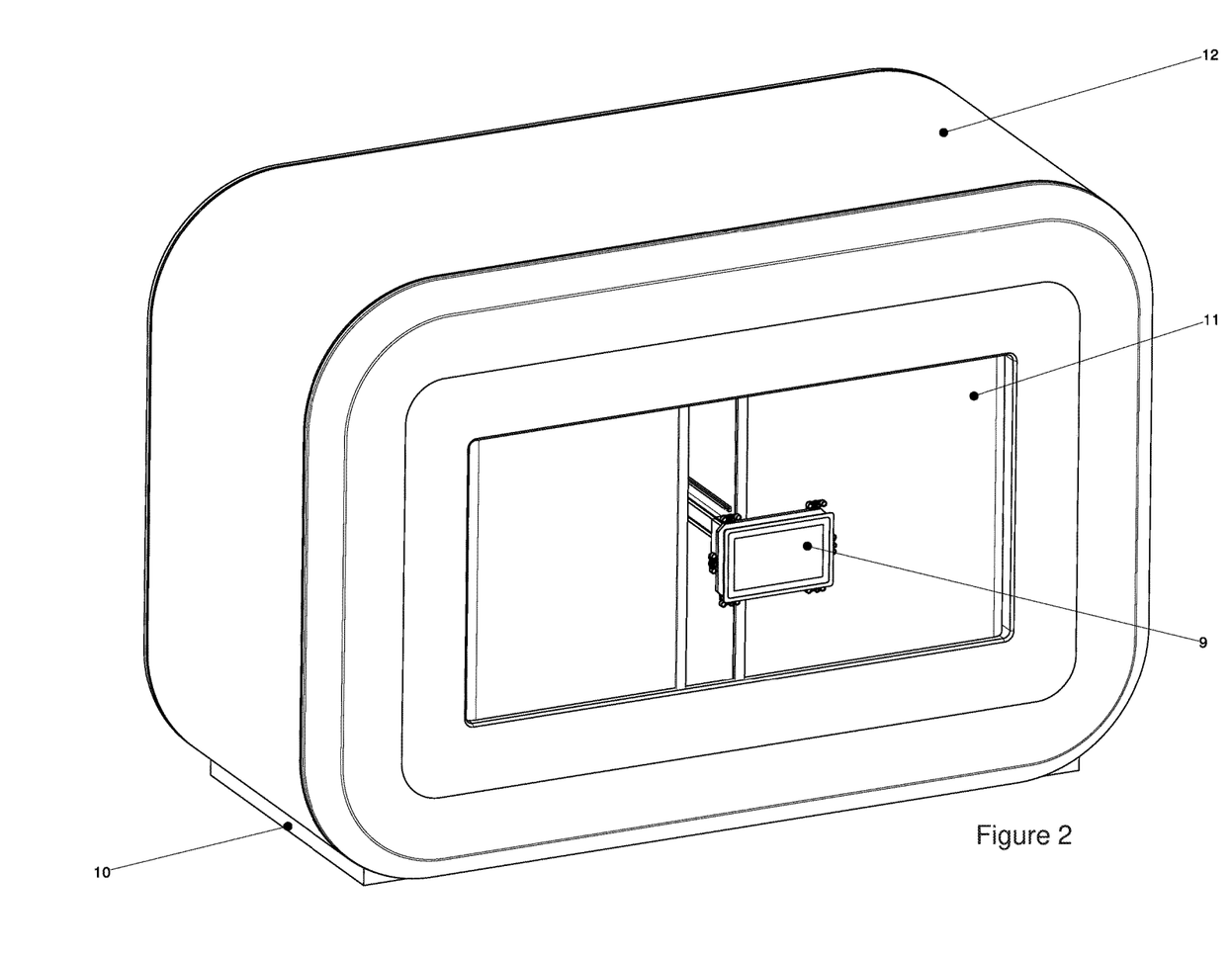
FIG. 2 shows a closeup of the housing shown in FIG. 1.

FIG. 2 shows a closeup of the housing shown in FIG. 1. Here, one can see that the housing 6 has a base 10, portal 11, and exterior side 12. The portal 11 allows the interface 9 to pass outside of a space circumscribed or otherwise surrounded on at least four sides by the housing 12. The portal 11 can be closed during operation but for a vertical or horizontal slit (defined as "having a width less than 20% of the whole) in the portal to prevent dust from entering the housing and/or open only as far as necessary. The opening in the portal 11 can open wider to allow an interface 9 to exit and then narrow to a wide of a supporting arm holding the interface 9 in embodiments of the disclosed technology.

Figure 3:
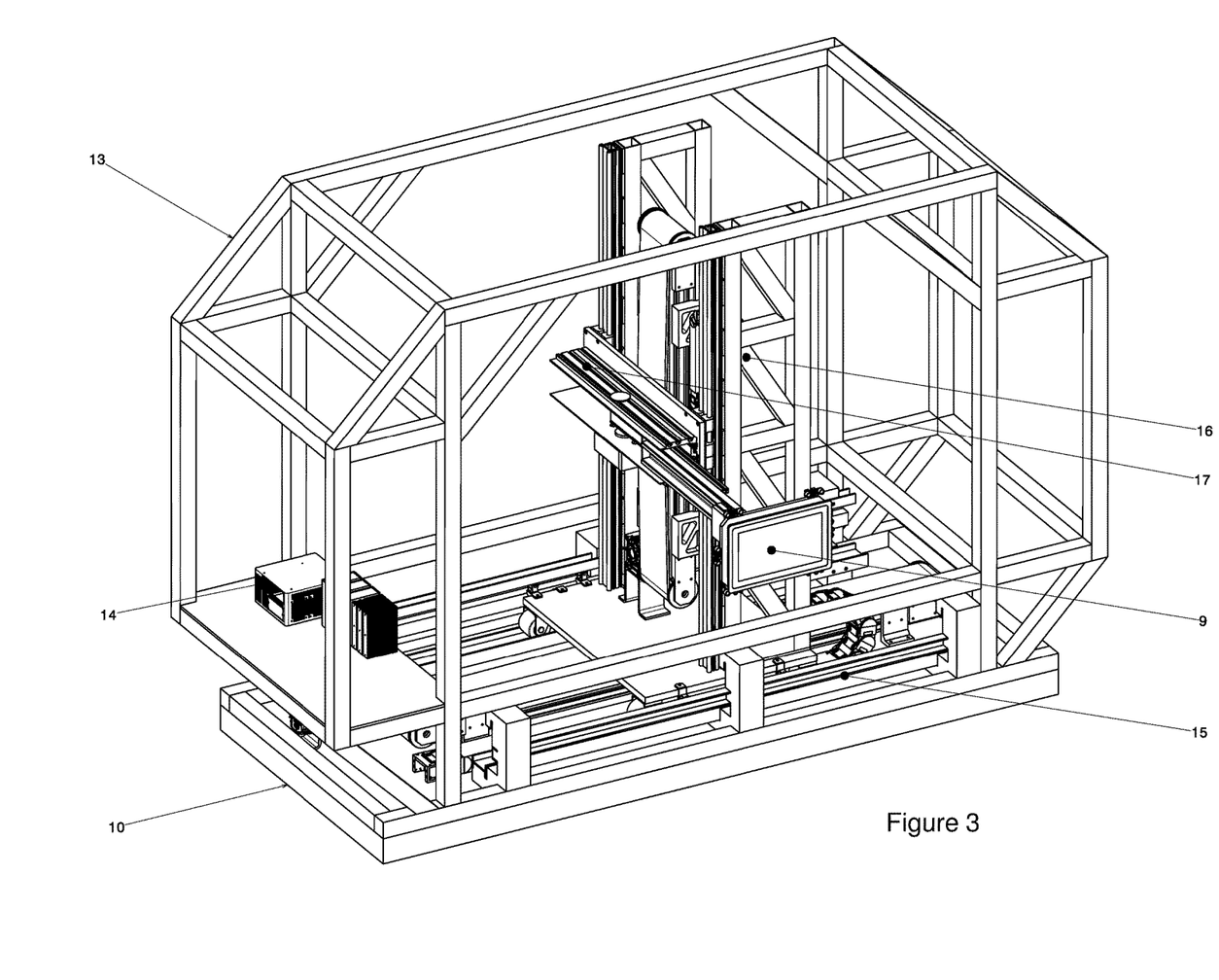
FIG. 3 shows an interior of the housing of FIG. 1 in an embodiment of the disclosed technology.

FIG. 3 shows an interior of the housing of FIG. 1 in an embodiment of the disclosed technology. The housing, in this embodiment, has a support structure 13. A motor 33 is used to rotate belts which pull or push a dolly or cart 28 along horizontal rails 15 as shown. A system rack 14 holds the motor to the housing. This allows the X-axis position (horizontal position) of the interface to change such that the interface 9 is within an X-axis position of a vehicle window. The Y-axis position (vertical position) of the interface can be changed by way of vertical rails 44 which have belts connected to motors in embodiments of the disclosed technology to raise and lower the interface 9. A telescoping arm 17 is used to vary the Z-axis (pushed away from the housing and towards a vehicle or back away from the vehicle and towards the housing) of the interface 9. In this manner, the X, Y, and Z position of the interface 9 which is attached to the telescoping arm 17 can be varied to match that of a window, and more precisely, a portal into a vehicle cabin. The telescoping arm 17 moves up and down on the vertical rails 44 which are on top of a dolly or platform which moves horizontally by way of horizontal rails 15 in an embodiment of the disclosed technology. Scaffolding 16 can be used to strengthen and provide a support structure to the vertical rails.

Figure 4:
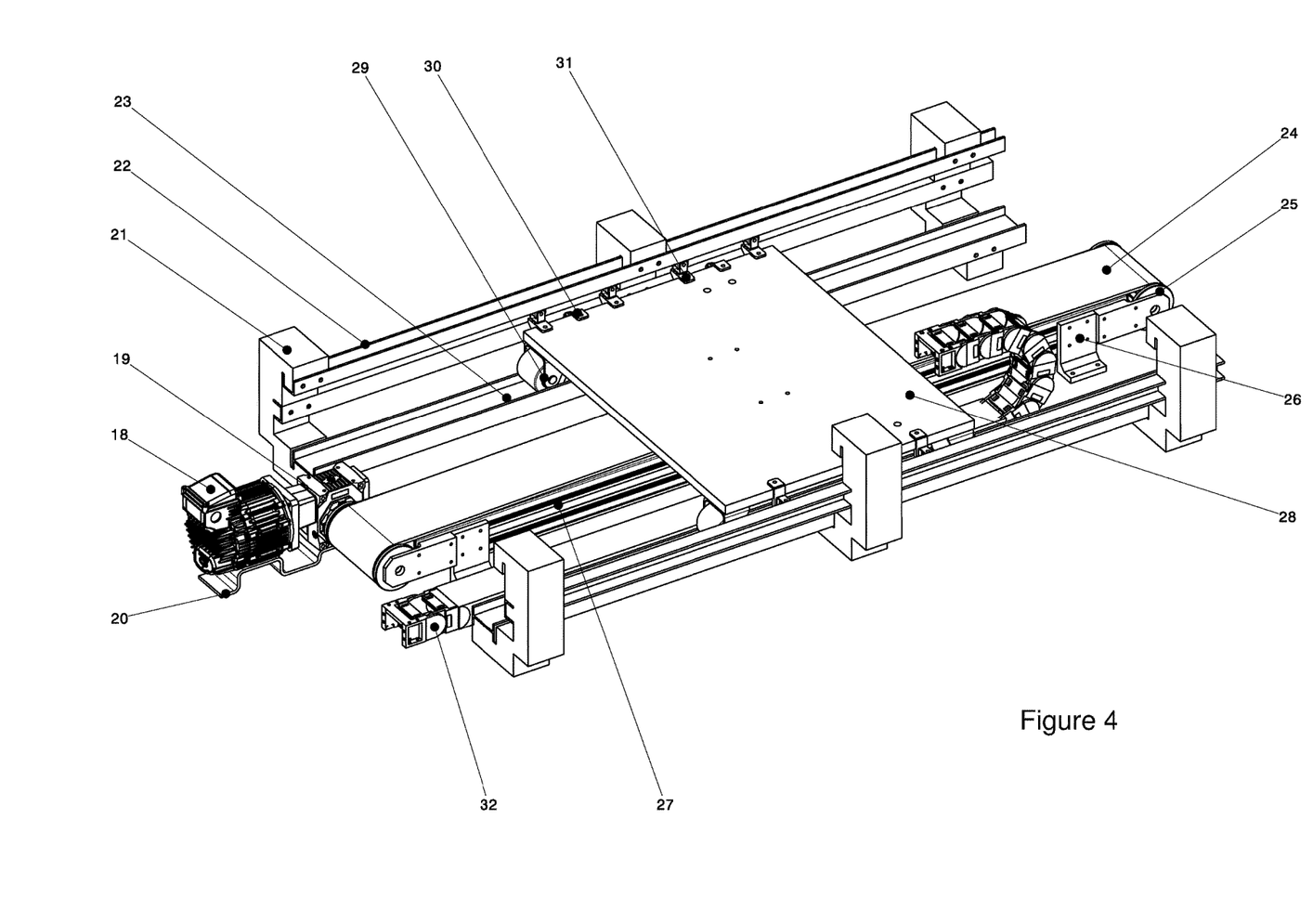
FIG. 4 shows a perspective view of a horizontal rail assembly used in an embodiment of the disclosed technology.

FIG. 4 shows a perspective view of a horizontal rail assembly used in an embodiment of the disclosed technology. A motor 18 with gearbox 19 turns a belt 24 which moves a platform or dolly 28 along rails 23 and 27. This, in turn, moves the interface horizontally. Brackets 20, 26 and 32, as shown, can be used to secure the horizontal rail assembly to a housing or ground. A roller 25 allows for rotatable movement of the belt 24. Wheels 28 can be used to roll the dolly 28 horizontally and fasteners 30, 31, and 21 can be used to attach vertical rails to the horizontal assembly.

Figure 5:
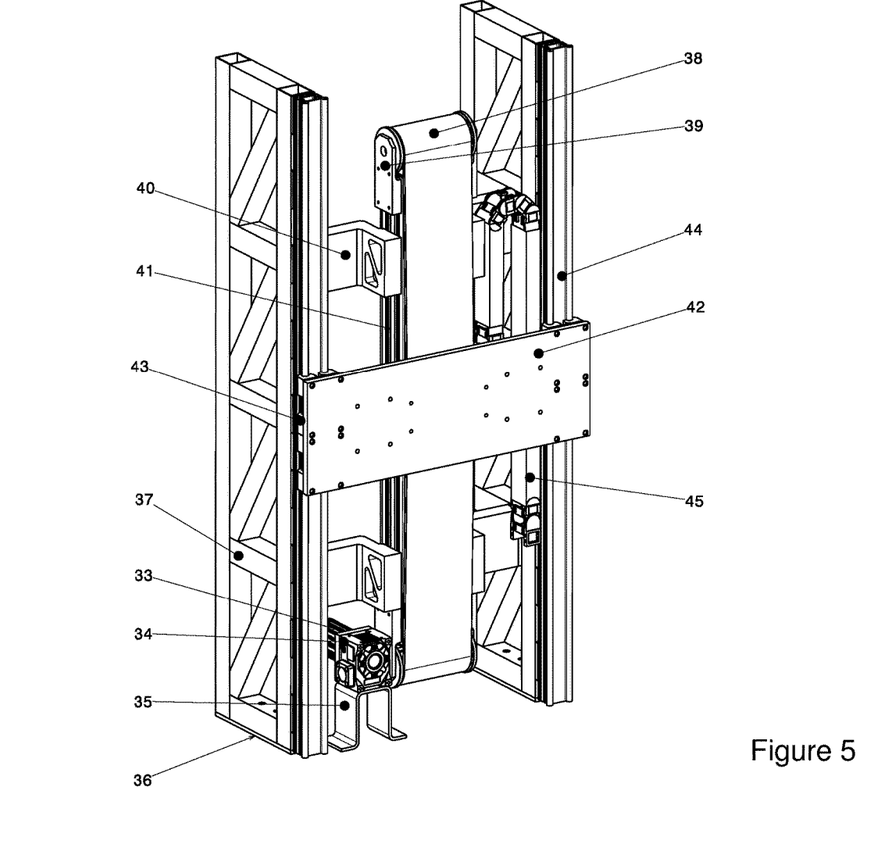
FIG. 5 shows a perspective view of the vertical rails and associated part of an embodiment of the disclosed technology.

FIG. 5 shows a perspective view of the vertical rails and associated part of an embodiment of the disclosed technology. A bracket 35 and/or bottom side 36 of the vertical rails 44 attaches to a platform which moves along the horizontal rails. Element 45 is an energy chain used to carry cables. Each vertical rail 44 has a motor 33 which is attached to a belt 38 which extends around rollers 39. A redactor box 34 is attached to the belt 39 by way of a pin 34 which rotates the belt. Within the redactor box 34 the movement to from a first to a second direction is carried out from a motor. Fixed to the belt is a vertical platform 42 (it's most elongated side being oriented along the Y-axis) which is slidably connected to front rails 44. The front rails 44 are two parallel vertical tracks on which the vertical platform 42 moves within the vertical rails. By operating the motor in a clockwise or counterclockwise direction, the platform 42 is movable upwards or downwards (along the afore-described Y-axis).

Figure 6:
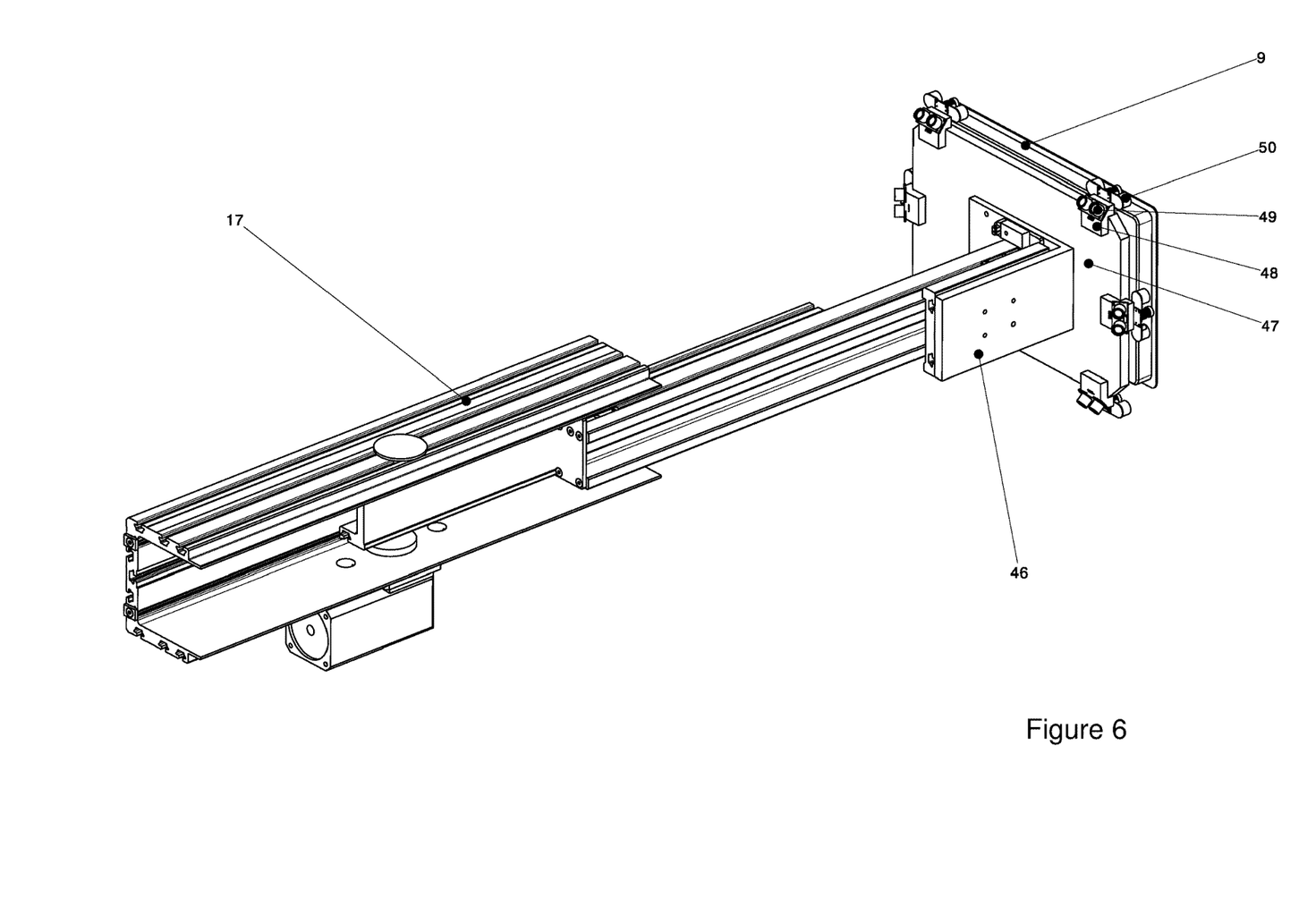
FIG. 6 shows a perspective view of a telescoping arm of an embodiment of the disclosed technology.

FIG. 6 shows a perspective view of a telescoping arm of an embodiment of the disclosed technology. The telescoping arm 17 is connected at one end to the vertical platform 42 and to the interface 9 at an opposite end thereof. The telescoping arm 17 has at least two sections with rails such that the two sections extend or contract relative to one another, overlapping or being separate from one another along their more elongated lengths in varying amounts. An L-bracket 46 connects the telescoping arm 17 to an interface platform 47 in an embodiment of the disclosed technology. The L-bracket 46 is sized to fit within an area circumscribed by/between sides of a larger region of the telescoping arm 17 such that a portion of the L-bracket which is in communication with the interface platform 47 can abut a larger region of the telescoping arm 17. In this manner, the interface 9 can be retracted until the telescoping arm is overlapping to a greatest amount as the bracket 46 is the limiter of retracting movement of the telescoping arm 17 in such an embodiment.

By way of an attachment mechanism 49 and/or 50 the interface 9 can be held to the interface platform 47. On these attachment mechanisms can be sonar and night vision cameras. Such attachment mechanisms can include any or combination of clips, brackets, magnetic attachments, frictional attachments (e.g. glue or sticky pads), and/or rack and pin type connectors. The interface 9 requires electrical current to operate in some embodiments of the disclosed technology. This can be based on battery power with a battery stored in the interface 9 or a wire which passes from the interface 9 through the telescoping arm 17 to a power source (e.g. power grid). The interface 9 requires network connectivity in some embodiments of the disclosed technology. This can be by way of a wireless communication channel (such as the 802.11 protocol used in the art) or a wire passing through the telescoping arm 17 to another network node.

Figure 7:
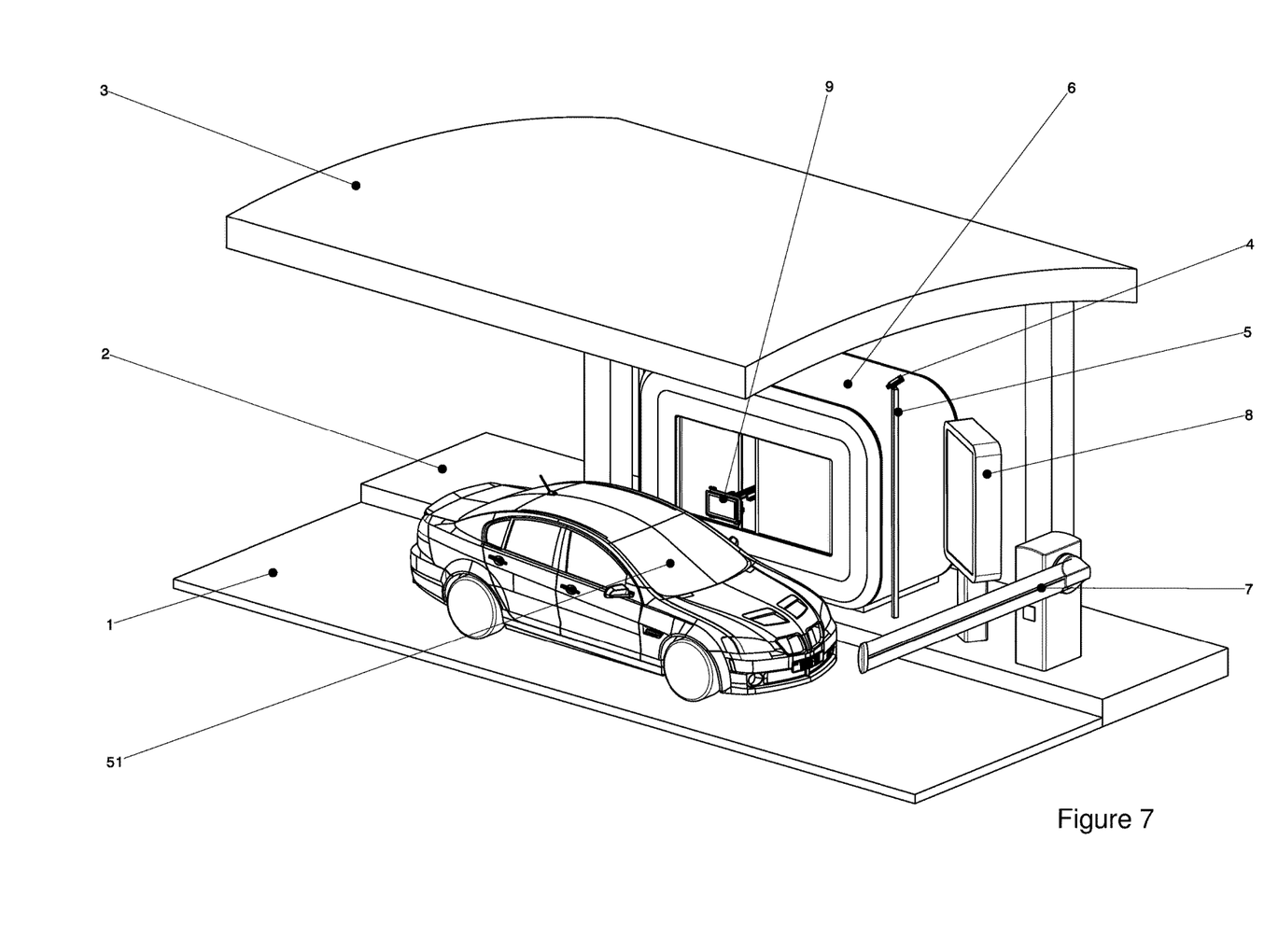
FIG. 7 shows a vehicle which is ready to receive the interface in embodiments of the disclosed technology.

FIG. 7 shows a vehicle which is ready to receive the interface in embodiments of the disclosed technology. The vehicle 51 has pulled onto the driveway 1 or other ground near and/or adjacent to the housing 6. A camera 4 or series thereof have been used to determine a precise position of the cabin of the car and/or a driver within the car and/or a window of the car. This can be based on prior data about position and shape of the car cabin, windows, steering wheel, and person as well as typical motion of a person (e.g. falling forward slightly relative to the vehicle when the vehicle stops) to determine based on the sensory input (camera) where to move the interface 9. The interface is then moved into position along one or both of the X-axis and Y-axis in either sequence or simultaneously. Then the interface 9 is moved out from the housing 6 and towards the vehicle 51 along the Z axis.

Figure 8:
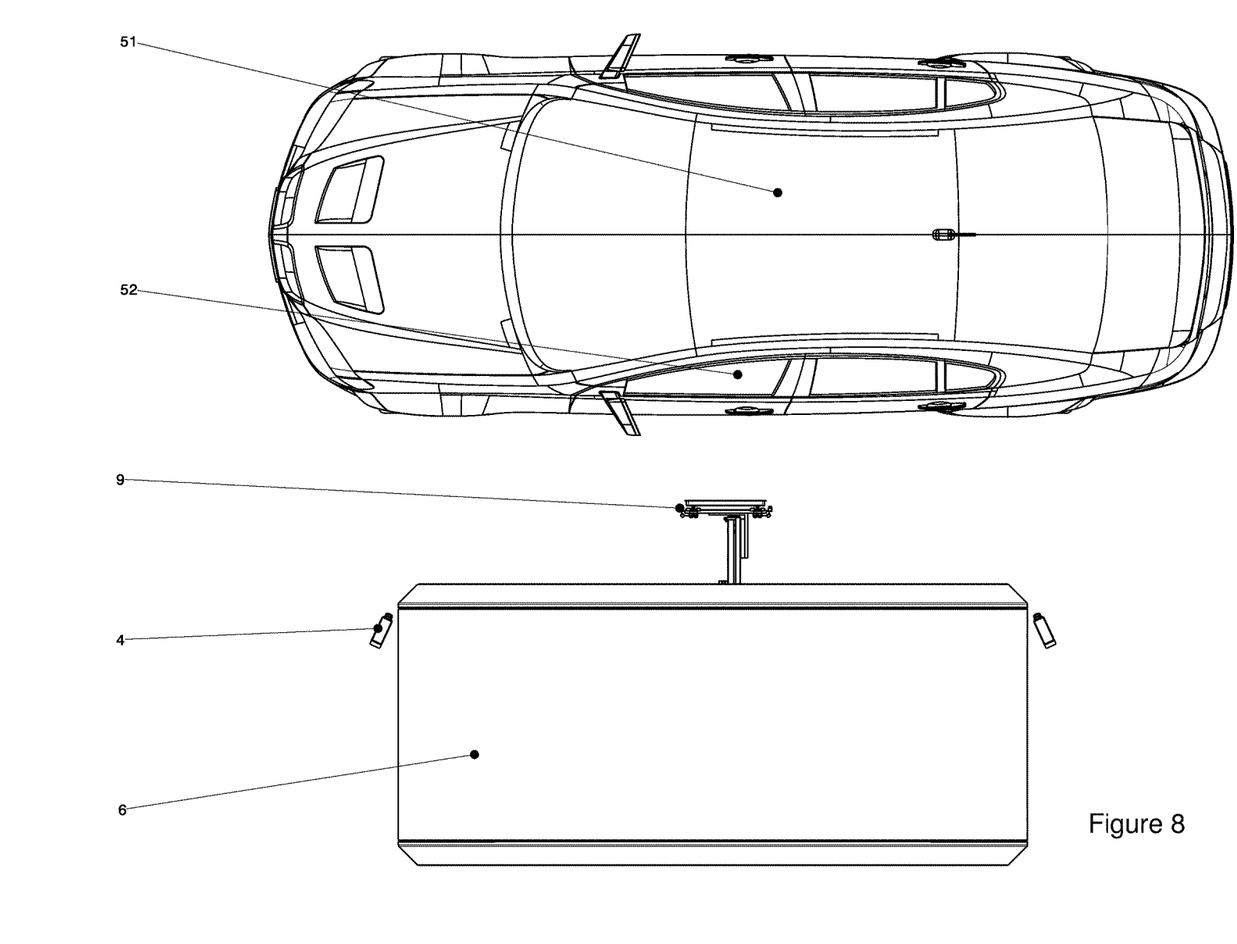
FIG. 8 shows a top view of a vehicle and housing with interface extending from the housing in an embodiment of the disclosed technology.

FIG. 8 shows a top view of a vehicle and housing with interface extending from the housing in an embodiment of the disclosed technology. Here, the vehicle 51 is shown with a side window frame 52, e.g. a driver's side front side window. The camera 4 is used to see the side of the car and determine, such as by where the side view mirror is, color of the body, or window that the window frame 52 is in a certain position. Movement of the window can also be determined and only once the window is seen opening or is open with a clear path into the vehicle is the interface 9 moved towards the vehicle 51. By using infrared distance sensing with regular infrared light transmissions to blanket the area with points of light one can determine a depth or distance from the camera to each solid object.

By knowing the relative size of window, one can use this size information to find where the depth (distance) to the car suddenly increases inside of a window or above a chassis in the case of a convertible sedan. In this manner, the position of a window 52 and a portal into or between the vehicle 51 body is determined. One can also sense motion of a driver as someone sitting in the vehicle will have certain directions of movement and velocity thereof. The vehicle itself will be at rest relative to the camera 4, but a person in the vehicle will have some movements while remaining in view of the camera. This can also aid in confirming the position of the window frame 52 and opening into the chassis of the vehicle 51. Once the position(s) is/are confirmed, the interface 9 can be placed in a corresponding or averaged X and Y coordinate and then moved to the portal where the window frame 52 is or was, and/or adjacent thereto, and/or through and into the vehicle 51 cabin.

Figure 9:
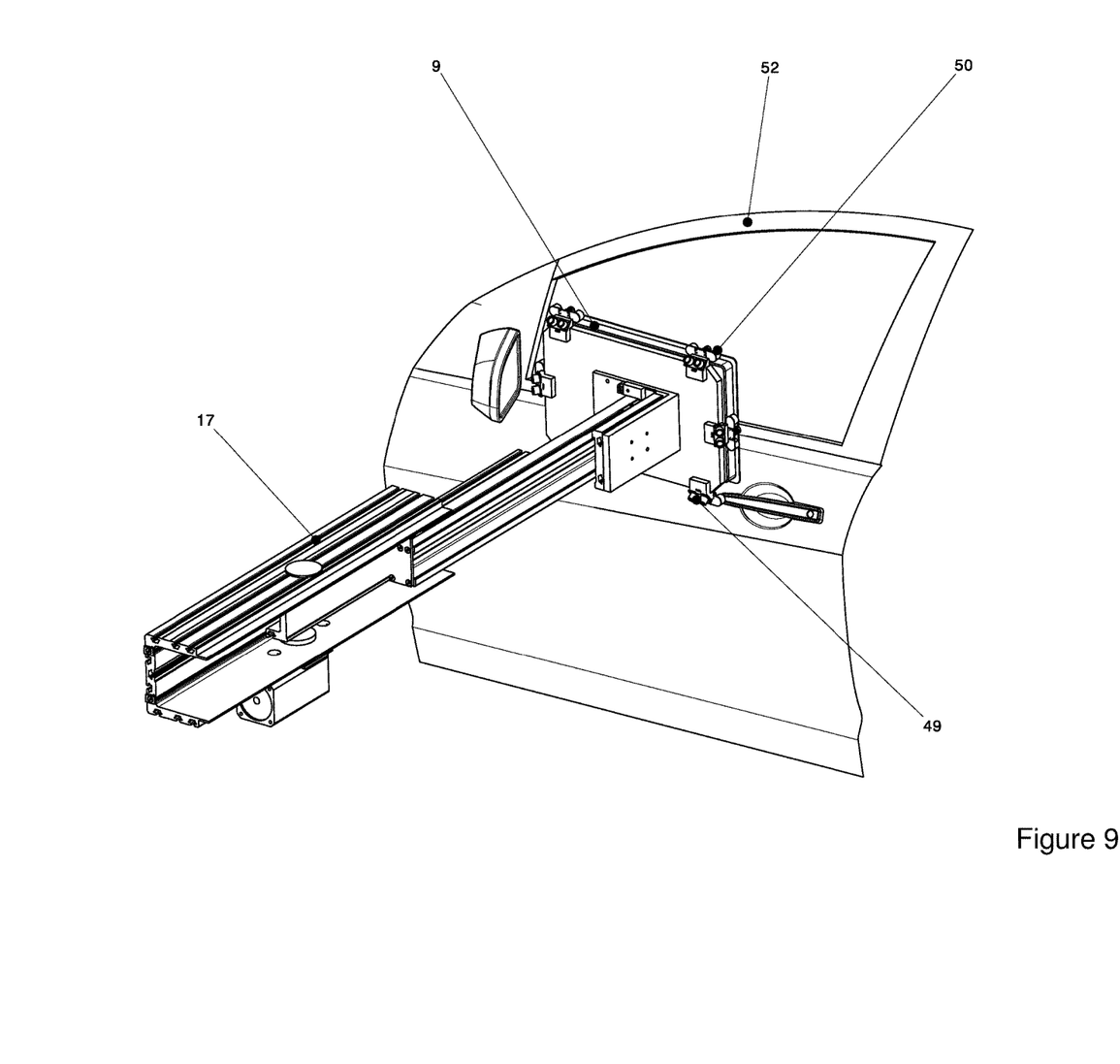
FIG. 9 shows a perspective view of an interface adjacent to a car window frame with interface adjacent thereto in an embodiment of the disclosed technology.

FIG. 9 shows a perspective view of an interface adjacent to a car window frame with interface adjacent thereto in an embodiment of the disclosed technology. Once the position of the window frame 52 has been positively determined based on the cameras and/or other optical and/or radio sensors and/or inputs and the X and Y positions of the telescoping arm 17 have been set such that the interface 9 is within the X and Y boundaries of the window frame 52 and/or within X and Y positions which are adjacent to the window frame 52 but for the Z axis, the telescoping arm 17 is extended along the Z axis such that the interface 9 moves towards the vehicle.

Figure 10:
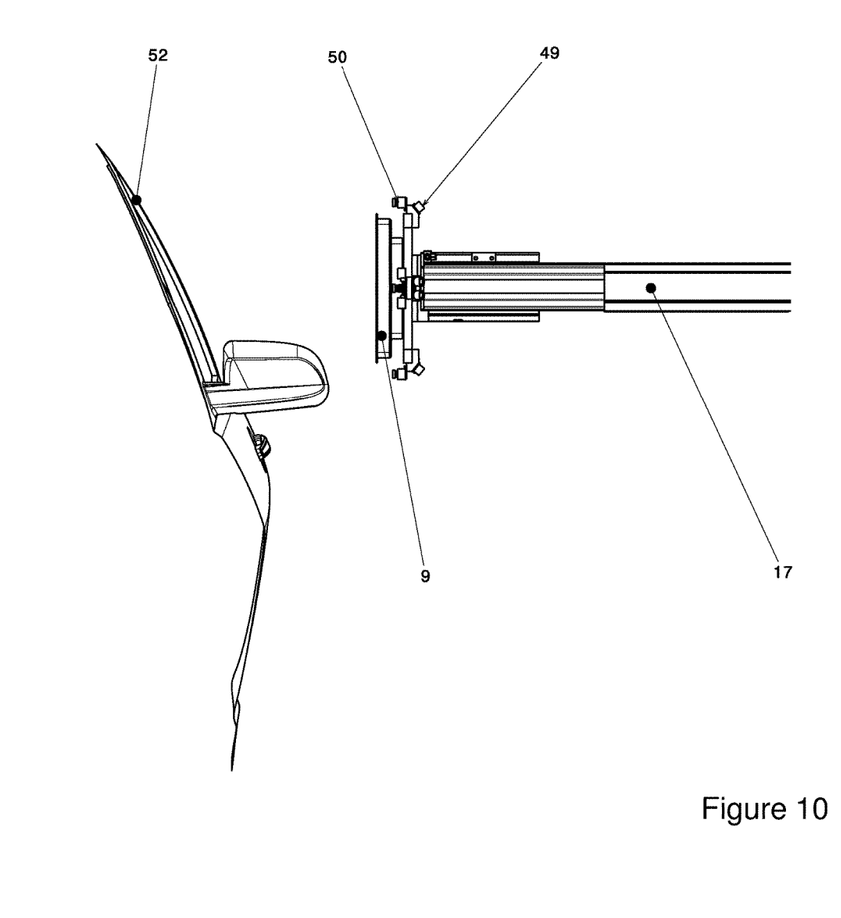
FIG. 10 shows a front view of an interface adjacent to a car window frame with interface adjacent thereto in an embodiment of the disclosed technology.

FIG. 10 shows a front view of an interface adjacent to a car window frame with interface adjacent thereto in an embodiment of the disclosed technology. In this view, the interface 9 can be understood as in position to be operated by way of a driver in the vehicle extending partially out of the window frame 52 and touching the interface 9 in an embodiment of the disclosed technology. In another embodiment, this view can be understood as a snapshot in time of the telescoping arm 17 still extending and the interface 9 moving closer to the vehicle such as until the interface 9 extends into an area circumscribed by the window frame 52. Such movement along the Z-axis occurs into the window frame 52, in embodiments of the disclosed technology, once the X and Y axis have been set such that the interface 9 will move into a space within the window frame 52 and avoid contact with the vehicle. If movement of a window within the window frame 52 is detected, as a safety precaution, the interface 9 moves away from the vehicle and the telescoping arm 17 contracts in some embodiments of the disclosed technology.

Figure 11:
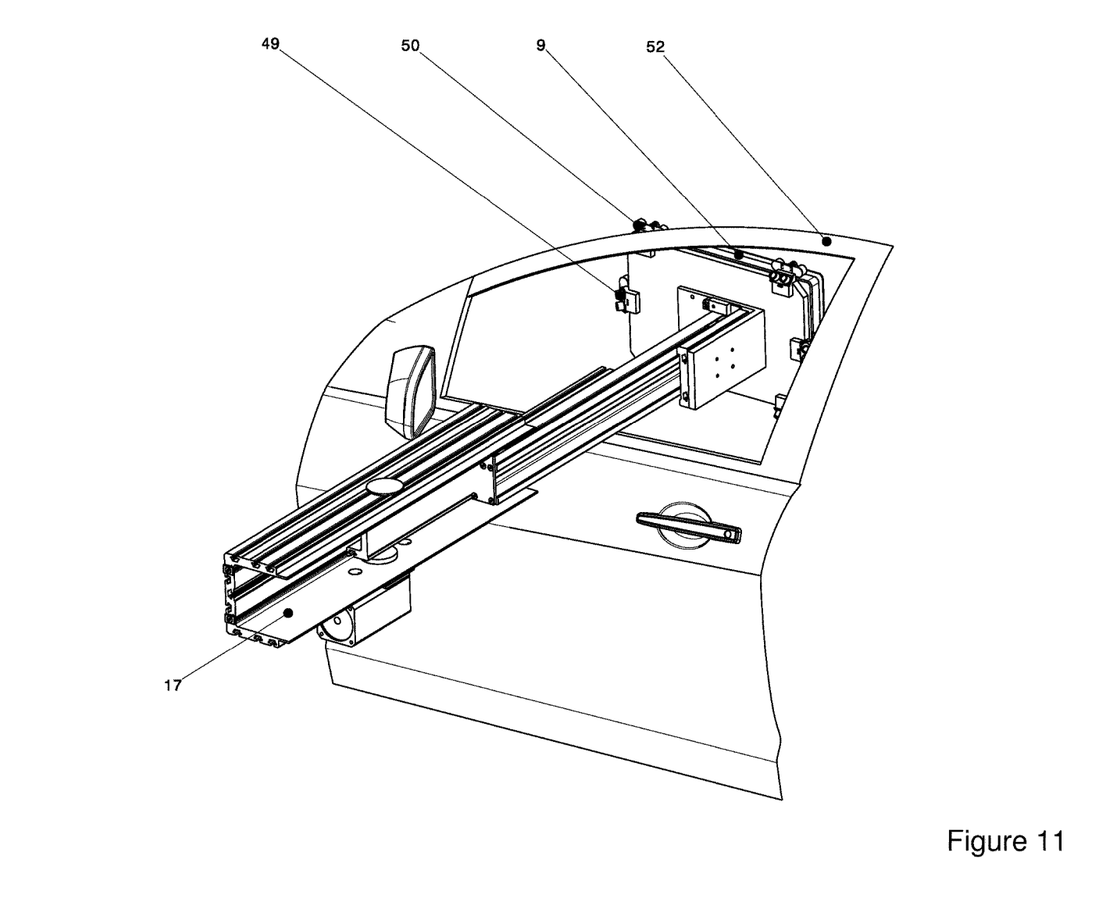
FIG. 11 shows a perspective view of the interface within a cabin of a vehicle in an embodiment of the disclosed technology.
Figure 12:
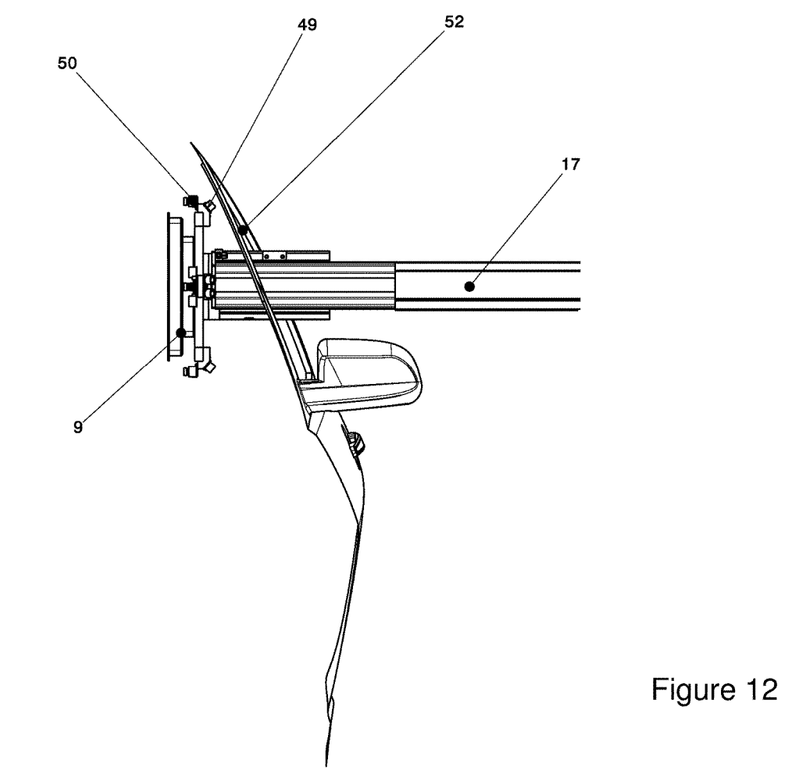
FIG. 12 is a front view of the devices shown in FIG. 11.

FIG. 11 shows a perspective view of the interface within a cabin of a vehicle in an embodiment of the disclosed technology. FIG. 12 is a front view of the devices shown in FIG. 10. Here, a part of the telescoping arm 17, the interface platform 47, and interface 9 have passed through the vehicle window frame 52 and into a cabin of the vehicle. A "vehicle" for purposes of this disclosure is defined as transportation device with an exterior structure housing a cabin for a person to ride therein. Once the interface 9 is positioned, in embodiments of the disclosed technology, a display indicating that the driver or other person can now operate and interact with the interface is made. This can be a display of a menu with food items to be ordered, by way of example. A person can then select items to order, insert a credit card for payment, and the like.

A computing device is used to carry out embodiments of the disclosed technology such as to process and determine a location of a vehicle, vehicle window, and/or vehicle window frame and send instructions to move the various devices described above such that the interface is placed in the correct position, a touch screen interface is used to record key presses, and so forth. Such devices can be connected to processor that control the overall operation of the computer by executing the device's program instructions which define such operation. The device's program instructions may be stored in a storage device (e.g. magnetic disk, database) and loaded into memory when execution of the console's program instructions is desired. Thus, the device's operation will be defined by the device's program instructions stored in memory and or storage and the console will be controlled by a processor executing the console's program instructions. A device also includes one or a plurality of input network interfaces for communicating with other devices via a network (e.g., the internet). The device further includes an electrical input interface. A device also includes one or more output network interfaces for communicating with other devices. Devices can also include input/output representing devices which allow for user interaction with a computer (e.g., touch screen interface, display, keyboard, mouse, speakers, buttons, etc.). One skilled in the art will recognize that an implementation of an actual device will contain other components as well.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A device comprising:
    a positionable user interface mounted to an arm;
    said arm movable along three axes;
    an input devices, as part of said device, receiving data used to determine a position of a window frame of a vehicle;
    a positioning device which positions said arm in a horizontal plane and vertical plane which is within a horizontal plane and vertical plane of said window frame;
    an extending mechanism which extends said user interface to be adjacent to said window frame.

2. The device of claim 1, wherein said extending mechanism extends said user interface through said window frame.

3. The device of claim 1, wherein said user interface is positioned in said horizontal plane of said window frame by way of moving a support structure, which supports said user interface, along horizontal rails.

4. The device of claim 3, wherein said user interface is positioned in said vertical plane of said window frame by way of raising or lowering said arm along vertical rails.

5. The device of claim 4, wherein said extending mechanism is said arm and said arm is extended by telescoping said arm to increase a length thereof.

6. The device of claim 4, wherein said horizontal rails and said vertical rails are held within a housing having a portal through which said arm passes.

7. The device of claim 6, wherein said portal through which said arm passes is closed but for a slit which moves with a horizontal position of said user interface and said arm.

8. The device of claim 1, wherein said input devices comprise visible and infrared cameras and use a combination of depth sensing and pre-entered data about shapes of vehicles and positions of windows to determine a position of said window frame.

9. The device of claim 8, wherein said depth sensing is further used to determine if a window is blocking a path through said window frame.

10. The device of claim 9, wherein said user interface is prevented from operation while moving and is configured to be operated by a user only after being placed adjacent to or through said window frame.

11. A method of positioning a user interface, comprising steps of:
    providing an interface configured to move in each of an X-axis, Y-axis, and Z-axis;
    providing horizontal rails configured to move a support structure along said X-axis;
    providing vertical rails extending from said support structure configured to move a telescoping arm along said Y-axis;
    wherein said telescoping arm configured to move a user interface along said Z-axis;
    providing cameras receiving data to determine a position of at least a part of a vehicle;
    providing a processor using said data sufficient to determine said position of said at least a part of said vehicle to move said user interface in at least one of said X-axis and said Y-axis and to move said user interface towards said vehicle along a Z-axis.

12. The method of claim 11, wherein said at least a part of said vehicle is a window frame and said user interface is moved adjacent to said window frame.

13. The method of claim 11, wherein said at least a part of said vehicle is a windows frame and said user interface is moved through an area circumscribed by said window frame.

14. The method of claim 13, wherein said window frame is a window frame for a side window of a driver.

15. The method of claim 11, wherein said user interface is configured to be operated by a person in said vehicle after said user interface is stationary with respect to said X-axis, said Y-axis, and/or said Z-axis and disabled to said interact with said person in said vehicle when said user interface is moving with respect to said X-axis, said Y-axis, and/or said Z-axis.

16. The method The positionable user interface of claim 11, wherein said cameras comprise at least one infrared camera determining an open, closed, or moving state of a window in a window frame and a result of a changed said state of said window movement of said user interface changes.

17. The method The positionable user interface of claim 16, wherein said user interface moving towards said vehicle along said Z-axis is carried out only when said window is determined to be in said open and a non-moving state.

18. The method of claim 17, wherein detecting said moving state of said window causes said user interface to retract along the Z-axis.

19. The method of claim 11, wherein said support structure is within a housing having a closable portal on a side thereof, said telescoping arm extending through said closable portal.

20. The positionable user interface of claim 19, wherein said telescoping arm extends through a slit of said closable portal.

* * * * *